United States Patent [19]

Dousek

[11] Patent Number: 5,268,081
[45] Date of Patent: Dec. 7, 1993

[54] ELECTROLYTIC SOURCE OF PRESSURIZED HYDROGEN

[75] Inventor: Frantisek Dousek, Prague, Czechoslovakia

[73] Assignee: Ceskoslovenska Akademie Ved, Praha, Czechoslovakia

[21] Appl. No.: 925,563

[22] Filed: Aug. 4, 1992

[51] Int. Cl.$^5$ .................... C25B 1/12; C25B 9/00; C25B 11/04; C25B 15/08
[52] U.S. Cl. .................... 204/237; 204/270; 204/284; 204/290 R
[58] Field of Search .............. 204/258, 270, 290 R, 204/129, 237, 284

[56] References Cited

U.S. PATENT DOCUMENTS

| | | | |
|---|---|---|---|
| 2,494,264 | 1/1950 | Ryman | 204/258 X |
| 2,695,874 | 11/1954 | Zdansky | 204/258 |
| 2,786,811 | 3/1957 | Swope | 204/258 X |
| 3,379,634 | 4/1968 | Rutkowski | 204/258 |
| 3,812,026 | 5/1974 | Bertrand et al. | 204/258 X |
| 4,294,683 | 10/1981 | Peré | 204/258 |

*Primary Examiner*—Donald R. Valentine
*Attorney, Agent, or Firm*—Notaro & Michalos

[57] ABSTRACT

An electrolyzer is formed by electrolytic cells, electrically connected in serious. Each cell is provided with inlets and outlets for filling with electrolyte into which dip the positive oxygen electrode and negative pressurized hydrogen electrode with an inner outlet of hydrogen. The hydrogen electrodes are formed by at least one inner layer, by covering layer and by the metallic coating. Said inner layers have the value of hydrogen overvoltage at the highest 0.25 V, said covering layer has the hydrogen overvoltage between 0.3 and 0.4 V and said metallic coating has the hydrogen overvoltage between 0.5 and 1.5 V. The hydrogen electrodes, formed as non-polarizable reversible systems are connected through their inner hydrogen outlets with the inlet of the hydrogen receptacle on condition given by $$V_O < \tfrac{1}{2} V_H$$

where
$V_O$ is the volume of the part of the electrolyte reservoir which is filled with oxygen
$V_H$ is the volume of the hydrogen receptacle
where by the oxygen electrodes are polarizable.

4 Claims, 1 Drawing Sheet

5,268,081

ELECTROLYTIC SOURCE OF PRESSURIZED HYDROGEN

FIELD AND BACKGROUND OF THE INVENTION

The invention concerns an electrolytic source of high purity pressurized hydrogen.

Until the present time for the preparation of hydrogen in an electrolytic way, supplied under pressure higher than atmospheric, the filter-press construction of the cells connected in series is still used. Each individual electrolytic cell is formed by a pressure vessel divided into two parts by a vertical partition which ends above the bottom of the vessel to allow free motion of the electrolyte. In one part of the pressure vessel the negative hydrogen electrode dips into the electrolyte, in the other part the positive oxygen electrode. In the lid of the pressure vessel above the two compartments there are gas outlets for hydrogen and oxygen respectively provided by release valves. When voltage is applied to the electrodes the generation of the two gases occurs. The building-up of the gas pressure is achieved by closing the release valves, whereby it is necessary to draw the two gases proportionally in order to maintain equal pressure in both parts of the vessel. If this were not obeyed, the level of the electrolyte in the compartment with higher gas pressure would sink under the low edge of the partition and the two gases would mix up.

The disadvantage of these electrolyzers is the relatively complicated regulation and security systems for keeping equal gas pressure in the two parts of the cell; the greater the gas pressure the higher must be the accuracy of equalizing the pressures of the two gases. Another draw-back is the high content of oxygen in the thus produced hydrogen and vice versa. Moreover, both gases contain a high percentage of an aerosol of the electrolyte which must be additionally removed in separators. Another known device for the generation of pressurized hydrogen is an electrolyzer utilizing the diffusion porous pressurized hydrogen electrode the construction of which depends on the required hydrogen output.

While the electrolyzers for lower hydrogen output, up to several liters of hydrogen per hour, are formed by a single pressure vessel with small electrodes electrically connected in parallel, the higher hydrogen sources consist of a row of electrolytic cells connected in series. The electrolytic cells are formed by pressure vessels filled by an electrolyte into which dip the positive oxygen electrode and the negative reversible pressurized hydrogen electrode.

The electrolytic cells are further provided by inlets and outlets for a connection to the electrolyte circulatory system. The circulatory system, consisting of the electrolyte pump and the connecting, input and collecting channels, provides the supply of water to the electrolyte and its homogenization. However, at the same time it represents an inner electrolyte short-circuit of the electrolyzer cells. In consequence of this short-circuit there occur parasitic currents which have a negative effect upon the power output of the electrolyzer as well as, under certain circumstances, upon the purity of the generated hydrogen. The latter happens especially when the electrolyzer current is either switched off or reduced to a value near to that of the parasitic current. In that case in the hydrogen pipeline there appears an increased oxygen content which can mount up to several percent. The reason for this is that in the above quoted cases, due to the residual cell voltage, the parasitic currents, which are of a sign opposite to that of the generation current, produce an opposite polarization of the electrodes. This reversed polarization, especially marked in the case of a great number of cells, brings about a partial inversion of the function of the electrolyzer so that on the hydrogen electrodes oxygen is evolved while, on the other hand, on the oxygen electrodes hydrogen is produced, and this continues until the residual voltage of the electrolyzer falls to zero. For that reason in the electrolyzers of that type the generation current cannot be, as a rule, reduced under the limit of 30% in order to prevent the contamination of the generated hydrogen by oxygen. In case the electrolyzer is switched off and then on again, it is necessary to rinse thoroughly the hydrogen pipeline by hydrogen produced at the nominal output before pure hydrogen can be drawn.

The hydrogen electrodes of these types of electrolyzers consist of several layers. For the inner layers nickel and a special nickel catalyst are used in order to secure minimum overvoltage in hydrogen evolution. The external coating layer is usually made of copper because of the advantageous value of hydrogen overvoltage and because of applicability of the convenient technology of powder metallurgy. In an electrode manufactured in this way a preferential evolution of hydrogen on its inner layer is achieved. That is due to the average diameter of the pores of the inner layer between 0.04 and 0.06 mm as compared with the pores in the outer copper layer, smaller by an order of magnitude, about 0.003 mm. After the electrode is dipped into the electrolyte the pores of the external layer are closed by the capillary pressure which exceeds 100 kPa. In consequence, the hydrogen evolved in the inner layer does not penetrate into the electrolyte and can be drawn from the space of the inner layer under pressure not much higher than the 100 kPa. However, in reality some percentage of hydrogen evolves also on the outer copper layer and so, besides of the losses in hydrogen generation, there occurs the danger of formation of the explosive mixture in combination with oxygen. Besides, the efficiency of the described electrode decreases fairly quickly, be it due to the fatigue if the catalyst or to the deposition of impurities on the electrodes.

The above hydrogen electrodes represent a complex construction unit composed of several different materials differing in porosity, pore sizes, dimensions, shape, compressibility and even in thermal contraction in sintering. Especially the difference in contraction of the materials of the two adjacent layers of the electrode causes undesired deformations in the boundary regions during sintering. These deformations enlarge the pores of the outer layer which lowers the limit of the maximum attainable pressure of hydrogen.

SUMMARY OF THE INVENTION

The above quoted shortcomings are avoided by an electrolytic source of pressurized hydrogen according to the invention which consist in electrolytic cells electrically connected in series, provided with inlets and outlets for filling by the electrolyte into which dip the positive oxygen and the negative hydrogen pressurized electrodes with an outlet of hydrogen from the inner part of the electrode formed by at least one inner and one outer layer, all of porous material with hydrophilic surface, of which the inner layers have the value of hydrogen overvoltage at the highest 0.25 V and the outer layer has the hydrogen overvoltage between 0.3 and 0.4 V, further in an electrolyte reservoir, connected with the electrolytic cells by a bottom distribution channel and a top collecting channel for the circulation of the electrolyte, characterised by the connection of the hydrogen electrodes through their inner hydrogen outlets with the inlet of the hydrogen receptacle on condition given by $$V_O < \tfrac{1}{4} V_H$$

where $V_O$ is the volume of that part of the electrolyte reservoir which is filled with oxygen and $V_H$ is the volume of the hydrogen receptacle whereby the hydrogen electrodes are formed as nonpolarizable reversible systems, while the oxygen electrodes are polarizable. According to the advantageous realization the hydrogen electrodes are provided by a coating of a hydrophilic material with hydrogen overvoltage between 0.5 and 1.5 V.

According to another advantageous realization the materials of all the layers of the hydrogen electrode have the same value of thermal contraction in sintering.

Another advantageous realization consists in positioning of the inlet of the collecting channel into the electrolyte reservoir above the level of the outlets from the elektrolytic cells of the mixture of the electrolyte with oxygen.

A significant property of the electrolyzers according to the invention is an elimination of the effect of the parasitic currents upon the purity of the generated hydrogen which is in that way independent of the generation current.

A marked feature is an increase of the efficiency of the hydrogen electrodes to a value approaching 100%. In an electrolytic way of coating or in cementation, the metallic deposit forms preferentially on places with the lowest hydrogen overvoltage which results in an efficiency of almost 100% with already a very small amount of the deposited metal.

The electrolyzer according to the invention allows an up to 50% increase of the pressure of hydrogen as compared with the hitherto known devices, due to the equalization of the contractions of the materials of all the layers of the hydrogen electrode. In this way the maximum theoretical value of the hydrogen pressure is reached given by the structure of the materials used. In the hydrogen receptacle the hydrogen pressure can then be increased to the value limited by the strength of the pressure vessel, the requirements on precision of the regulation being lowered at the same time by up to two orders of magnitude. The construction of the electrolyzer is simpler, the used circulatory system of the electrolyte does not need circulation pumps.

BRIEF DESCRIPTION OF THE DRAWINGS

On the enclosed drawings the FIG. 1 represents the main scheme of the electrolyzer.

DESCRIPTION OF THE PREFERRED EMBODIMENT

Figure 1:
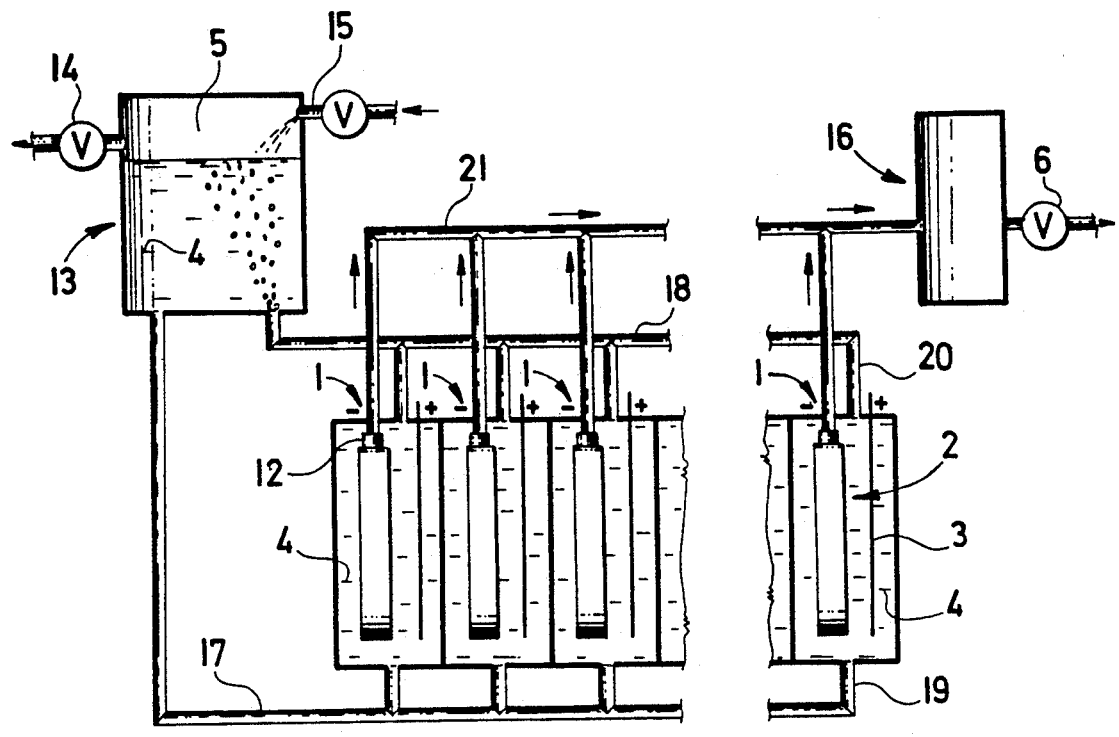
Figure 2:
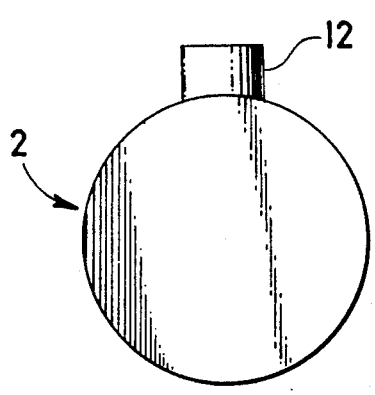
FIGS. 2 and 3 show the hydrogen electrode in an outline and in a cross-section.
Figure 3:
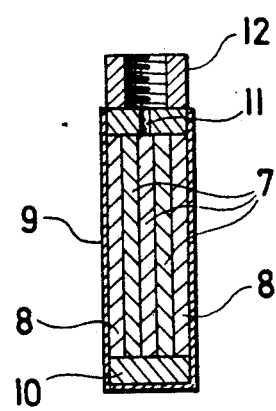

The electrolyzer according to the invention, represented in FIGS. 1 to 3, is formed by electrolytic cells 1 tightly packed sideways, electrically connected in series. Each cell 1 contains a hydrogen electrode 2 and an oxygen electrode 3 dipping into an alkaline electrolyte 4. The outlet of the generated hydrogen can be realized, e.g., by means of a metallic clamp with a central channel or with circumferential channels. The clamp, which serves also for bringing the negative voltage to the hydrogen electrode 2 by 2, is connected to the outlet 12 of the hydrogen electrode 2 by means of a winding. The hydrogen electrodes 2, usually of a cylindrical shape, consist of several layers of porous material with hydrophilic surface. For the inner layers 7 nickel is used as a rule, with a nickel catalyst, on which the potential of the hydrogen electrode 2 gets established, whereby the value of hydrogen overvoltage of this material is, at the highest, 0.25 V. For the covering layer 8 it is convenient to use copper for which the value of hydrogen overvoltage is between 0.3 and 0.4 V. These layers 7, 8 are clamped by the ring 10 in which the vent channel 11 for hydrogen is provided in the place of hydrogen outlet 12. The entire surface of the hydrogen electrode 2 is covered by the coating 9 which can be made of tin, zinc, lead or of another metal with the value of hydrogen overvoltage higher than 0.5 V. All the above described layers of the hydrogen electrode 2 are formed from materials of the same thermal contraction at the given sintering temperature. The required value of contraction can be reached by mixing the materials used for making the given layer and differing in thermal contraction. It is desirable that the potential of the hydrogen electrode 2 remains constant even if the direction of the polarization current changes; in practice such a situation occurs due to the parasitic currents. The hydrogen electrode is nonpolarizable while the oxygen electrode polarizable. As mentioned above, for the hydrogen electrode 2 a nickel catalyst is used on which the electrode reaction of hydrogen evolution occurs reversibly. That means that during the passage of the cathodic current hydrogen is evolved due to the reduction of hydrogen ions, and at the current reversal, i.e. during the passage of the anodic current, the electrode reaction is reversed and hydrogen is oxidized back to hydrogen ions. Both reactions occur at the same potential and the hydrogen electrode 2 behaves as nonpolarizable. The identical effect can be attained by connecting the material of the hydrogen electrode 2, e.g. nickel, with another metal in the form of the coating layer, e.g. copper, which in the case of current reversal gets reversibly oxidized at the electrode at a potential more negative then the potential of oxygen evolution; in this way again the undesired evolution of oxygen on the hydrogen electrode 2 is prevented. In the hydrogen electrode according to the invention both the nickel catalyst as well as the copper in the copper coating layer are used. On the other hand, the oxygen electrode 3 is made, e.g., of a smooth nickel sheet, so that in the case of current reversal the reaction of oxygen evolution stops and no other reaction occurs which could prevent the change of its potential. While the above mentioned reactions take place at the hydrogen electrode 2, the oxygen electrode 3 gets soon polarised to the potential of hydrogen electrode whereby the residual voltage of the electrolyzer falls to zero and the parasitic current disappears.

The electrolyte 4 is brought to the individual electrolytic cels 1 from the electrolyte reservoir 13 through the distribution channel 17 connected with the bottom parts of the cells 1 by the inlets 19. It returns to the reservoir 13 by means of the outlets 20 of the cells 1, connected by the collecting channel 18. The reservoir 13 is provided by the vent valve 14 of oxygen and the inlet 15 for refilling water into the electrolyte 4; in its top part the space 5 is formed, filled by oxygen. From the hydrogen electrodes 2 the hydrogen is led through the outlet 12 into the collecting duct 21 which ends in the hydrogen receptacle 16 provided by the outlet valve 6.

On connection of the negative voltage terminal to the hydrogen electrodes 2 and of the positive terminal to the oxygen electrodes 3 the generation of hydrogen and oxygen occurs. The hydrogen is collected in the hydrogen receptacle 16 where it is kept under the desired value of pressure while oxygen rises to the top parts of the electrolytic cells 1. As long as the level of the electrolyte 4 is maintained above the level of the outlets 20 of the electrolyte from the electrolytic cells 1 and of the collecting channel 18 of the electrolyte, there occurs a spontaneous circulation of the electrolyte 4. The reason of the circulation is following: due to the lower density of oxygen than of the electrolyte 4, i.e., due to the lowering of the hydrostatic pressure in the outlet and in the collecting parts of the pipeline, the electrolyte 4 mixed with oxygen streams upwards to the electrolyte reservoir 13 and, at the same time, the electrolyte 4 from the reservoir 13 streams into the distribution channel 17 and from there to the individual cells 1.

In course of the electrolysis the pressures of the gases mount: that of hydrogen in the hydrogen receptacle 16 and that of oxygen in the electrolyte reservoir 13. When the condition $$V_O < \tfrac{1}{2} V_H \quad (1)$$

is fulfilled, where $V_O$ is the volume of the oxygen-filled space in the electrolyte reservoir 13, and $V_H$ is the volume of the hydrogen receptacle 16, it is possible to maintain pressure conditions which prevent any erroneous or emergency situation, even with low requirements on precision of the regulation. As long as the above condition is satisfied, the pressure of oxygen in the electrolyte reservoir 13 mounts faster than the pressure of hydrogen in the hydrogen receptacle 16, as the ratio of the volumes of the generated hydrogen and oxygen is always 2:1. It follows from the above that when the outlet valve 6 of hydrogen is closed the ratio of the pressures of the two gases can be regulated by opening the outlet valve 14 of oxygen in such a way that the condition $$P_H < P_O > (P_H - P_C) \quad (2)$$

remains all the time valid where $P_C$ is the capillary pressure of the electrode, $P_H$ is the pressure of hydrogen in the receptacle 16, and $P_O$ is the pressure of oxygen in the electrolyte reservoir 13.

From the inequality (2) it then follows that the oxygen pressure can fluctuate within a relatively wide range given by the value of the capillary pressure $P_C$. In case the above condition is not fulfilled, i.e., if $P_O < (P_H - P_C)$, the hydrogen will escape through the pores of the coating 9 of the hydrogen electrode 2 into the electrolyte 4. If the left side of the inequality is not obeyed, i.e., if $P_O > P_H$, an emergency situation occurs in which the electrolyte penetrates through the protective layers of the hydrogen electrode 2 into its inner space 7 and further through the duct 12 into the hydrogen receptacle 16.

What is claimed:

1. An electrolytic source of pressurized hydrogen comprising: electrolytic cells, connected electrically in series, each said cell having:

an inlet and an outlet for circulation of electrolyte, connected with an electrolyte reservoir by a bottom distribution channel and a top collecting channel for the circulation of the electrolyte;

a positive oxygen electrode;

a negative pressurized hydrogen electrode provided with an inner hydrogen outlet, formed by at least one inner layer, a covering layer and a metallic coating, all made of porous material with a hydrophilic surface of which said inner layers have the value of hydrogen overvoltage at the highest 0.25 V, said covering layer has the value of hydrogen overvoltage between 0.3 and 0.4 V and said metallic coating has the value of hydrogen overvoltage between 0.5 and 1.5 V, said hydrogen electrode is connected through said inner hydrogen outlet with an inlet of a hydrogen receptacle on condition given by $$V_O < \tfrac{1}{2} V_H$$

where $V_O$ is the volume of the part of the electrolyte reservoir which is filled with oxygen; and $V_H$ is the volume of the hydrogen receptacle.

2. An electrolytic source according to claim 1, wherein the hydrogen electrodes are formed as non-polarizable reversible systems whereby the oxygen electrodes are polarizable.

3. An electrolytic source according to claim 1, wherein the materials of all the layers of the hydrogen electrode have the same value of thermal contraction in sintering.

4. An electrolytic source according to claim 1, wherein the inlet of the collecting channel into the electrolyte reservoir is positioned above the level of the outlets from the electrolyte cells of the electrolyte mixed with oxygen.

* * * * *